(12) United States Patent
Maus

(10) Patent No.: US 6,670,020 B1
(45) Date of Patent: Dec. 30, 2003

(54) HONEYCOMB BODY CONFIGURATION WITH AN INTERMEDIATE LAYER CONTAINING AT LEAST ONE METAL LAYER AND SANDWICH STRUCTURE IN PARTICULAR FOR A HONEYCOMB BODY CONFIGURATION

(75) Inventor: Wolfgang Maus, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 1 day.

(21) Appl. No.: 09/615,531

(22) Filed: Jul. 13, 2000

Related U.S. Application Data

(63) Continuation of application No. PCT/EP99/00047, filed on Jan. 7, 1999.

(30) Foreign Application Priority Data

Jan. 13, 1998 (DE) .......................................... 198 00 926

(51) Int. Cl.$^7$ ................................................. B32B 3/12
(52) U.S. Cl. ............... 428/116; 428/292.1; 428/311.11; 428/312.4; 428/324; 428/325; 428/337; 428/363; 428/450; 428/454; 428/469; 428/621; 428/622; 428/689; 428/703; 277/606; 277/607; 277/627
(58) Field of Search .................. 428/116–118, 457, 428/469, 688, 689, 524, 615, 621, 622, 363, 292.1, 446, 450, 454, 121, 122, 124, 126, 192, 220, 304.4, 311.11, 312.12, 312.4, 325, 337, 703; 422/177, 211, 222; 277/590, 606, 602, 607, 627

(56) References Cited

U.S. PATENT DOCUMENTS

| | | | | |
|---|---|---|---|---|
| 5,008,086 A | * | 4/1991 | Merry | |
| 5,196,253 A | * | 3/1993 | Mueller et al. | |
| 5,488,826 A | * | 2/1996 | Paas | |
| 5,948,504 A | * | 9/1999 | Swars et al. | |
| 6,051,193 A | * | 4/2000 | Langer et al. | |
| 6,299,843 B1 | * | 10/2001 | Locker et al. | |

FOREIGN PATENT DOCUMENTS

| | | |
|---|---|---|
| DE | 24 58 994 | 6/1976 |
| DE | GM 80 19 813 | 10/1980 |
| DE | 36 38 049 A1 | 5/1988 |
| DE | 38 27 863 A1 | 2/1990 |
| DE | 39 22 667 A1 | 9/1990 |
| DE | 38 20 981 C2 | 6/1991 |
| DE | 42 36 883 A1 | 9/1993 |
| DE | 295 00 725.7 | 4/1995 |

* cited by examiner

*Primary Examiner*—Cathy Lam
*Assistant Examiner*—Wendy Boss
(74) *Attorney, Agent, or Firm*—Laurence A. Greenberg; Werner H. Stemer; Ralph E. Locher

(57) ABSTRACT

A honeycomb body configuration includes an intermediate layer for reducing transmission of heat from a honeycomb body to a housing by heat radiation and prevents erosion of ends of the intermediate layer. The intermediate layer has a plurality of layer portions formed from at least one metal sheet and at least one layer of ceramic material. The intermediate layer preferably includes a thermally insulating layer portion, a metal sheet and a swell mat. Ends of the metal sheet cover at least one of the layer portions at the end. The invention is particularly suitable for supporting honeycomb bodies of thin wall ceramic for uses close to the engine in exhaust gas cleaning systems of motor vehicles. It is, however, generally also suitable for the thermal insulation of honeycomb bodies of all kinds with respect to a housing. A sandwich structure, in particular for a honeycomb body configuration, is also provided.

23 Claims, 2 Drawing Sheets

HONEYCOMB BODY CONFIGURATION WITH AN INTERMEDIATE LAYER CONTAINING AT LEAST ONE METAL LAYER AND SANDWICH STRUCTURE IN PARTICULAR FOR A HONEYCOMB BODY CONFIGURATION

CROSS-REFERENCE TO RELATED APPLICATION

This application is a continuation of copending International Application No. PCT/EP99/00047, filed Jan. 7, 1999, which designated the United States.

BACKGROUND OF THE INVENTION

Field of the Invention

The present invention relates to a honeycomb body configuration including a housing, a honeycomb body disposed in the housing, and an intermediate layer containing a plurality of layer portions and surrounding the honeycomb body in the housing. Such configurations are used in particular in exhaust gas cleaning systems of motor vehicles, especially for catalytic converters with ceramic honeycomb bodies. The invention also relates to a sandwich structure in particular for a honeycomb body configuration.

German Utility Model GM 80 19 813 U1 already discloses a holder for ceramic honeycomb bodies, in which the honeycomb body is encased in a so-called swell mat and is disposed in a metal housing. The swell mat is capable of swelling to fill up cavities which occur due to different performance characteristics on the part of the housing and the honeycomb body and due to manufacturing tolerances, and can thus ensure a secure support effect over a long period of operation. Swell mats generally contain small pieces of mica which absorb water and in so doing expand, if there is space available in their surroundings. In order to stabilize such swell mats, the utility model proposes integrating a corrugated knitted wire mat into the swell mat. In order to protect the swell mat from being eroded at the ends of the honeycomb body, gas sealing rings are to be provided at the ends of the honeycomb body to cover over a gap which is filled by the swell mat.

Honeycomb bodies in exhaust systems heat up during operation to a temperature of 900° C. and more and components disposed in the proximity of the honeycomb body configuration are to be protected from that high temperature. It is therefore also known to provide a thermally insulating intermediate layer between the housing and the honeycomb body.

That thermally insulating layer can be a layer of air which, by virtue of low levels of heat conduction and heat convection properties of the air, insulates the housing from the high temperatures which occur in the honeycomb body during use of the honeycomb body configuration.

Alternatively or in addition to the insulation afforded by the air layer, it is known to provide an intermediate layer which is formed of a ceramic material. That also involves thermal insulation for the housing from the honeycomb body by virtue of low heat conduction and heat convection properties of the ceramic materials being used. The above-mentioned swell mats for holding honeycomb bodies give off water at very high ambient temperatures of, for example, above 800° C. and in so doing shrink. The honeycomb body can therefore become loose in the housing. Swell mats must be thermally insulated in relation to the honeycomb body in certain heavily loaded honeycomb body configurations. For that purpose, it is already known for the honeycomb body to be initially provided with a thermal insulation and only then to be enclosed with a swell mat.

However, at temperatures above about 600° C. heat transmission occurs not only by heat conduction and heat convection but also, to an increasing degree with temperature, by heat radiation. Nevertheless, the above-described thermal insulations which are known from the state of the art, as well as swell mats, only provide little insulation effect in relation thereto.

A further disadvantage of known honeycomb body configurations is that the insulating intermediate layers which are disposed between the housing and the honeycomb body are eroded by hot pulsating exhaust gases in the region of the ends of the honeycomb body configuration. Even a ceramic intermediate layer which in itself is highly abrasion-resistant is abraded by virtue of the pulsating exhaust gas flow in the course of operation. In that way the thermal insulation between the honeycomb body and the housing is disadvantageously damaged or destroyed in the course of the period of operation of the honeycomb body configuration. That involves damage and possibly even destruction of the entire honeycomb body configuration.

SUMMARY OF THE INVENTION

It is accordingly an object of the invention to provide a honeycomb body configuration with an intermediate layer containing at least one metal layer and a sandwich structure in particular for a honeycomb body configuration, which overcome the hereinafore-mentioned disadvantages of the heretofore-known devices of this general type, in which the honeycomb body configuration reduces heat transmission through heat radiation from the honeycomb body to a housing or a swell mat and preferably also prevents or at least reduces erosion of the intermediate layer and in which the sandwich structure permits such a honeycomb body configuration to be easily produced.

With the foregoing and other objects in view there is provided, in accordance with the invention, a honeycomb body configuration, comprising a housing; a honeycomb body disposed in the housing; and an intermediate layer surrounding the honeycomb body in the housing, the intermediate layer having a plurality of layer portions including at least one metal sheet and at least one layer of ceramic material.

With the objects of the invention in view, there is also provided a sandwich structure, in particular for a honeycomb body configuration, comprising at least one metal sheet; and a ceramic layer of thermally insulating fiber material joined to the at least one metal sheet.

By virtue of the fact that in accordance with the invention the intermediate layer contains a plurality of layer portions which include at least one metal foil or sheet, heat transmission from the honeycomb body to the housing through the use of heat radiation is advantageously reduced. The honeycomb body configuration also has good thermal insulating properties in terms of heat conduction and heat convection since in accordance with the invention there are provided a plurality of layer portions which also includes at least one layer of ceramic material. That applies in particular when the ceramic material involves a very low level of heat conductivity.

In accordance with another feature of the invention, any cavities which remain in the honeycomb body configuration between the housing and the honeycomb body upon manufacture thereof or which are formed in the course of operation are advantageously closed if at least one of the layer portions of ceramic material is a swell mat which, upon absorbing water, closes cavities adjacent thereto by swelling. That provides that the honeycomb body is durably and firmly held in position.

In accordance with a further feature of the invention, an embodiment of the intermediate layer which is advantageous from the point of view of production procedure is also afforded by the fact that a layer portion in the form of a metal sheet makes it possible for the honeycomb body configuration to be produced in a simple manner, in particular by winding or coiling. In particular, if the at least one metal sheet and at least one ceramic layer are joined to form a sandwich structure, the intermediate layer can be wound in the peripheral direction around the honeycomb body in a simple procedure. More specifically, it can preferably be wound at least once, or a plurality of times if higher demands are made on the insulation. Production of preshaped half-shell portions in a sandwich structure is also a possible option.

In accordance with an added feature of the invention, the at least one metal sheet or foil at least at one end of the honeycomb body covers over an adjacent ceramic layer at the end. That provides for particularly effective protection, in particular from pulsating hot exhaust gases to be cleaned, which flow into the honeycomb body configuration, since they can no longer flow directly against the ceramic layer and thus erosion thereof is prevented.

In accordance with a concomitant feature of the invention, the metal sheets and the ceramic layers which are possibly connected thereto advantageously have a structuring, in particular a corrugation. That advantageously makes it possible for the metal sheets to be bent in the peripheral direction of the honeycomb body, using low forces.

Other features which are considered as characteristic for the invention are set forth in the appended claims.

Although the invention is illustrated and described herein as embodied in a honeycomb body configuration with an intermediate layer containing at least one metal layer and a sandwich structure in particular for a honeycomb body configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
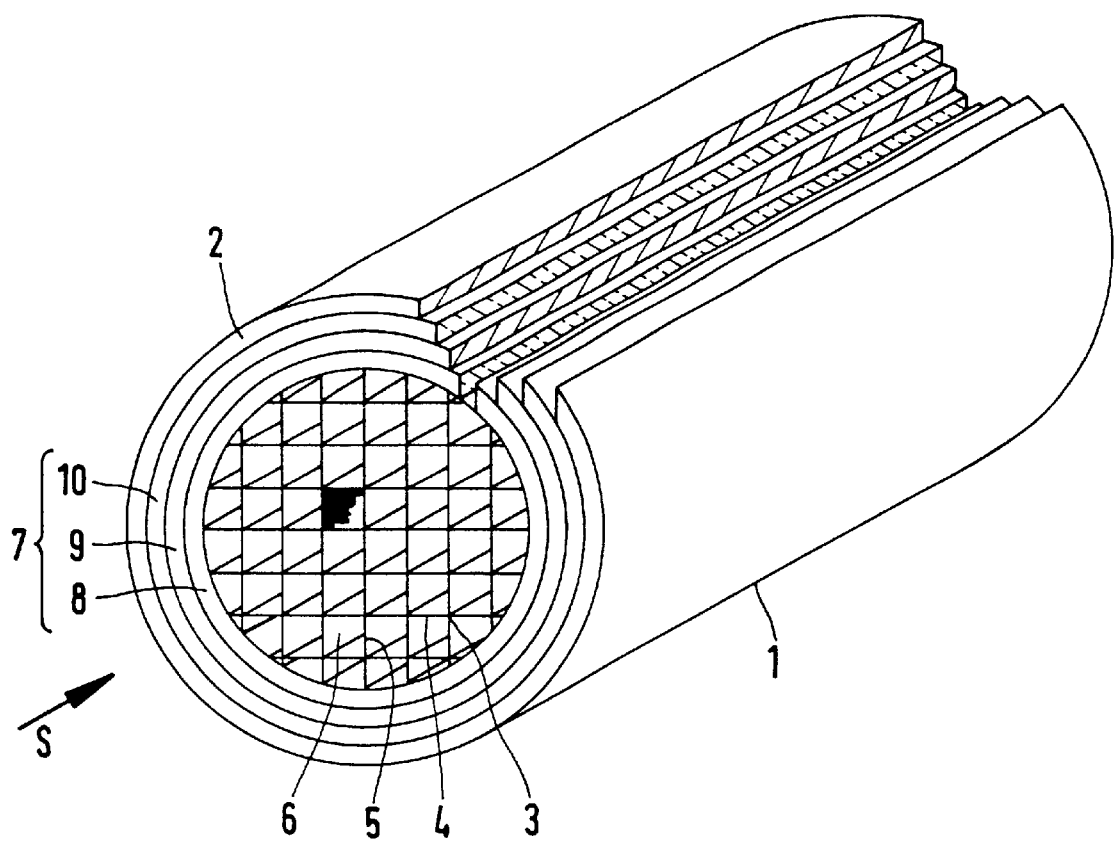
FIG. 1 is a diagrammatic, partly-sectional, perspective view obliquely onto an end of a first embodiment of the present invention.

Referring now to the figures of the drawings in detail and first, particularly, to FIG. 1 thereof, there is seen a diagrammatic, partly-sectional, perspective view, which is not to scale, of a honeycomb body configuration 1 according to the invention. A honeycomb body 3 has passages 6 which are separated from each other by partition walls 4, 5 and through which a fluid, preferably exhaust gas from an internal combustion engine, can flow in a flow direction S. The honeycomb body preferably involves an extruded ceramic honeycomb body, in particular a body including so-called thin-wall ceramic. Ceramic honeycomb bodies of that kind, as well as honeycomb bodies made from thin metal sheets, must be firmly mounted in a tubular housing or casing 2. An additional aim is to provide thermal insulation with respect to the tubular casing.

In the present embodiment, the above-mentioned mounting and insulation are afforded by a thermally insulating layer portion 8 of ceramic material, a metal foil or sheet 9 and a further layer portion of ceramic material 10, preferably a swell mat. Those three layer portions together form an intermediate layer 7 which on one hand securely holds the honeycomb body 3 in the tubular casing 2 and which on the other hand provides for very good thermal insulation. The thermally insulating layer portion 8 firstly prevents heat conduction and convection from the honeycomb body to the metal sheet 9. The metal sheet 9 also acts as a radiation shield in relation to heat radiation so that during operation of the honeycomb body configuration in an exhaust system of a motor vehicle, the layer portion 10 of ceramic material is already at a considerably lower temperature than the honeycomb body 3 itself. That consideration, when using a swell mat as the layer portion 10 of ceramic material, permits very high operating temperatures for the honeycomb body configuration, as occur, for example, in the case of exhaust cleaning devices, in particular catalytic converters, that are disposed close to an outlet from an internal combustion engine. It should be pointed out that the housing 2 generally has a thickness of from 0.5 to 1 mm while the metal sheet 9 is preferably a very thin foil or sheet, in particular with a thickness of less than $50\mu$, preferably even less than $30\mu$. The metal sheet 9 should in particular be formed of a material that is resistant to high temperature corrosion, in particular a chromium and aluminum-containing steel. The layer portions 8, 10 of ceramic material are typically fiber mats, as are known from the state of the art for supporting ceramic honeycomb bodies. The layer portions 8, 10 have a thickness that is required to compensate for production tolerances with respect to the housing 2 and the honeycomb body 3 and for securely supporting the same over a long period of operation. It should also be pointed out that a plurality of metal sheets and a plurality of layer portions of ceramic material which follow in succession radially can be provided in order, to improve the insulation in relation to heat radiation.

Figure 2:
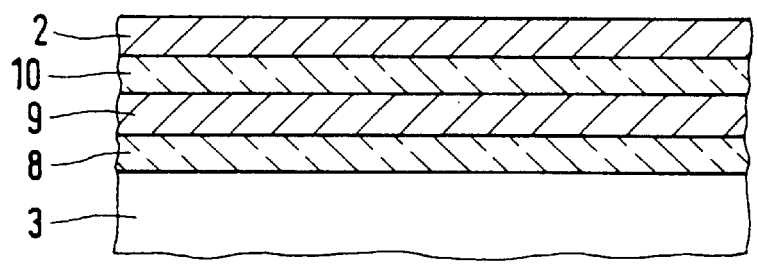
FIG. 2 is a fragmentary, longitudinal-sectional view of a part of the embodiment shown in FIG. 1.

FIG. 2 again illustrates the radial structure of a simple honeycomb body configuration according to the invention, through the use of a fragmentary, longitudinal-sectional view through the honeycomb body configuration. Following in succession from the inside toward the outside are the honeycomb body 3, a thermally insulating layer portion 8 of ceramic material, a metal sheet 9, a swell mat 10 and a casing or housing 2.

Figure 3:
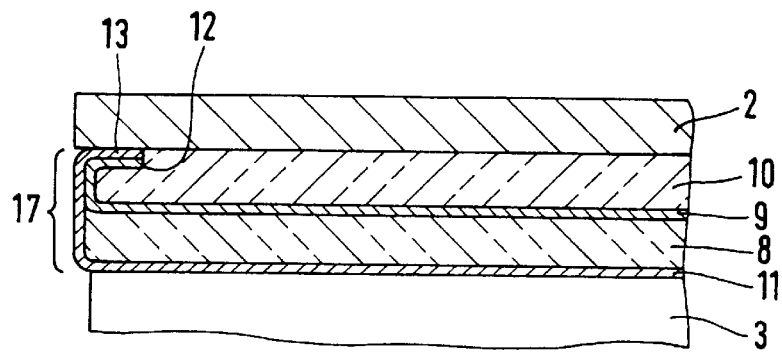
FIG. 3 is a fragmentary, longitudinal-sectional view of a further embodiment in the region of an end of the honeycomb body configuration.

FIG. 3 shows a preferred embodiment of the invention in the region of an end of a honeycomb body, through the use of a fragmentary, longitudinal-sectional view through a honeycomb body configuration. Since, as is known, pulsating hot exhaust gases can erode ceramic materials, in particular fiber mats, swell mats and the like, protection in relation thereto should be provided at one or preferably both ends of the honeycomb body configuration according to the invention. That can be achieved by a protective ring or a step in the housing, as in the case of conventional configurations. In accordance with the invention, however, there is another highly desirable solution, namely folding the metal sheet or sheets as an end protection measure around adjacent layer portions of ceramic material. The embodiment of FIG. 3 involves firstly winding a metal sheet 11 around the honeycomb body 3. A ceramic layer portion 8, then again a metal sheet 9 and then a further layer portion 10 of ceramic material are disposed around the metal sheet 11. In that configuration, ends 12, 13 of the metal sheets 9, 11 are folded around the respectively adjoining ceramic layers 8, 10 in accordance with the invention.

Such a configuration can be produced in the simplest situation by a procedure whereby firstly metal sheets 9, 11 which have ends projecting beyond the layer portions 8, 10 of ceramic material are wound around the honeycomb body 3, and then the projecting ends 12, 13 are folded through the use of a suitable tool around the layer portions 8, 10 of ceramic material. In that case, the folding operation can be effected in such a manner that the ends 12, 13 of the metal sheets 9, 11 are folded under the housing 2, as is illustrated in the present embodiments. It is, however, also possible for the ends 12, 13 to be incorporated into a weld seam for joining the housing 2 to an adjoining exhaust system.

It is particularly desirable for the production of honeycomb body configurations according to the invention if the layer portions used as the intermediate layer 7 are prefabricated in respective sandwich structures 17 and 27.

Figure 4:
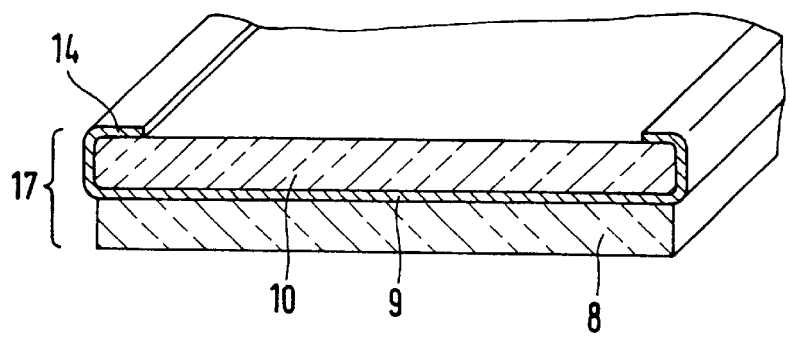
FIG. 4 is a fragmentary, partly-sectional, perspective view of a sandwich structure according to the invention.

Such an embodiment is shown in FIG. 4. In that case, a thermally insulating layer portion 8 of ceramic material is disposed, for example by gluing, at one side of a metal sheet 9. A swell mat 10 is disposed on another side of the metal sheet 9 and ends 14 of the metal sheet 9 are folded around the swell mat 10. Such a configuration can be wound around a honeycomb body or can already be prefabricated in a cylindrical or oval shape. If the thermally insulating layer portion 8 is formed of long ceramic fibers, it is not very susceptible to erosion by pulsating exhaust gas. Therefore, protection for the swell mat 10 by the folded-over ends 14 of the metal sheet 9 is sufficient.

Figure 5:
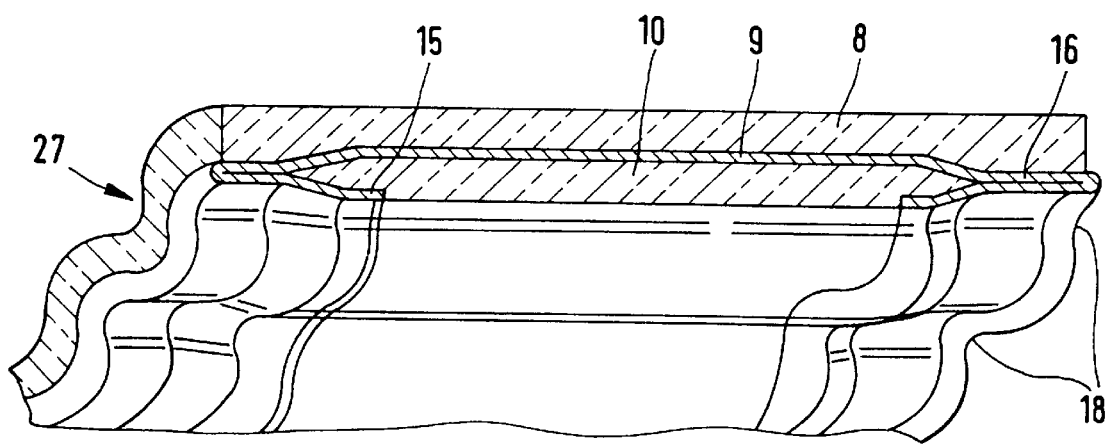
FIG. 5 is an enlarged, fragmentary, partly-sectional, perspective view of a corrugated sandwich structure according to the invention.

FIG. 5 shows a possible configuration of a sandwich structure 27 with metal sheets 9 which are folded over at ends 15 in order to improve flexibility upon winding it, for example around a cylindrical body. Although the metal sheet 9 is a very thin sheet or foil, a sandwich structure formed therefrom, with folded-over ends, becomes relatively stiff. In order to restore flexibility again the entire sandwich structure can be structured by a corrugated roll configuration, thereby producing corrugations 18 which are shown in greatly exaggerated form in FIG. 5. A corrugation which extends very shallowly is sufficient to afford flexibility. In that case the folded-over ends 15 of the metal sheet 9 are squashed flat in an end portion 16. The layer portion 8 of ceramic material, which belongs to the sandwich structure 27 and the swell mat 10 which is disposed in the interior of the metal sheet 9, ensure that no passages through which exhaust gas can flow are formed outside the honeycomb body 3, in spite of the slight corrugation 18 of the sandwich structure 27.

The present invention is suitable in particular for honeycomb body configurations for exhaust gas catalytic converters in a region adjacent the engine of motor vehicles. In that situation it permits firm mounting of metallic or ceramic honeycomb bodies with particularly thin walls and at the same time it provides for good thermal insulation of a honeycomb body with respect to its housing. A preferred area of use is honeycomb body configurations for ceramic honeycomb bodies of so-called thin-wall ceramic with wall thicknesses of less than $100\mu$, preferably less than $50\mu$.

I claim:

1. A honeycomb body configuration, comprising:
   a housing;
   a honeycomb body disposed in said housing and having an axial length and ends; and
   an intermediate layer surrounding said honeycomb body in said housing, said intermediate layer having a plurality of layer portions including at least one metal sheet and at least one layer of ceramic material, said at least one metal sheet entirely surrounding said axial length of said honeycomb body, said at least one layer of ceramic material having an end;
   said at least one metal sheet being a chromium and aluminum containing iron alloy and having at least one end shaped at least at one of said ends of said honeycomb body to cover said end of at least one adjacent layer of ceramic material, and said at least one metal sheet having an end folded around an adjacent layer of ceramic material.

2. The honeycomb body configuration according to claim 1, wherein said intermediate layer includes at least one layer portion of metal sheet and at least two layer portions of ceramic material.

3. The honeycomb body configuration according to claim 1, wherein at least one layer portion of ceramic material is a swell mat for closing adjacent cavities by swelling upon absorbing water.

4. The honeycomb body configuration according to claim 1, wherein at least one layer portion of ceramic material has a very low level of heat conductivity.

5. The honeycomb body configuration according to claim 1, wherein said at least one layer of ceramic material is formed of at least one fiber mat.

6. The honeycomb body configuration according to claim 1, wherein said at least one metal sheet and said at least one layer of ceramic material are joined to form a sandwich structure.

7. The honeycomb body configuration according to claim 6, wherein said sandwich structure is wound at least once in a peripheral direction around said honeycomb body.

8. The honeycomb body configuration according to claim 6, wherein said sandwich structure includes at least a ceramic layer providing a good thermal insulator, a metal sheet and a swell mat.

9. The honeycomb body configuration according to claim 6, wherein said sandwich structure includes at least an inner ceramic layer providing a good thermal insulator, a middle metal sheet and an outer swell mat.

10. The honeycomb body configuration according to claim 1, wherein said honeycomb body has a peripheral direction, said at least one metal sheet is a plurality of metal sheets, said at least one layer of ceramic material is a plurality of layers of ceramic material, and all of said metal sheets and all of said layers of ceramic material have a structuring permitting said metal sheets to bend with low levels of force in a peripheral direction of said honeycomb body.

11. The honeycomb body configuration according to claim 10, wherein said structuring is a corrugation.

12. The honeycomb body configuration according to claim 10, wherein all of said metal sheets have shaped regions with said structuring.

13. The honeycomb body configuration according to claim 10, wherein said layers of ceramic material are joined to said metal sheets to form a sandwich structure.

14. A sandwich structure, comprising:

at least one metal sheet having a first length; and at least one ceramic layer of thermally insulating fiber material joined to said at least one metal sheet, said at least one ceramic layer having a second length shorter than said first length;

said at least one metal sheet being a chromium and aluminum containing iron alloy and having two opposite ends, and said at least one metal sheet being folded around at least one adjacent ceramic layer at least at one of said ends.

15. The sandwich structure according to claim 14, wherein said ceramic layer of thermally insulating fiber material is disposed on one of said sides of said at least one metal sheet, and a layer of fiber material containing swell material is disposed on another of said sides of said at least one metal sheet.

16. The sandwich structure according to claim 15, wherein said swell material is mica.

17. The sandwich structure according to claim 14, wherein said ceramic layer is one of a plurality of ceramic layers, and said at least one metal sheet is a plurality of metal sheets alternating with said ceramic layers.

18. The sandwich structure according to claim 14, wherein said at least one metal sheet is formed of material resistant to high-temperature corrosion.

19. The sandwich structure according to claim 14, wherein said at least one metal sheet has a thickness of less than $50\mu$.

20. The sandwich structure according to claim 14, wherein said at least one metal sheet has a thickness of less than $30\mu$.

21. The sandwich structure according to claim 14, wherein said at least one metal sheet and said ceramic layer are structured.

22. The sandwich structure according to claim 14, wherein said at least one metal sheet and said ceramic layer are corrugated.

23. The sandwich structure according to claim 16, wherein said at least one metal sheet and said ceramic layer are structured to be easily wound around a honeycomb body and to form substantially no passages through which exhaust gas can flow outside the honeycomb body.

* * * * *